Feb. 8, 1927. Re. 16,548

J. WADDELL

STORAGE BATTERY CELL AND THE LIKE

Original Filed Feb. 8, 1921

Inventor

John Waddell

By Frank L. McClelin his Attorney

Reissued Feb. 8, 1927. Re. 16,548

UNITED STATES PATENT OFFICE.

JOHN WADDELL, OF BAKEWELL, ENGLAND, ASSIGNOR TO D. P. BATTERY COMPANY LIMITED, OF BAKEWELL, ENGLAND.

STORAGE-BATTERY CELL AND THE LIKE.

Original No. 1,488,721, dated April 1, 1924, Serial No. 443,485, filed February 8, 1921. Application for reissue filed September 22, 1925. Serial No. 57,976.

This invention relates to storage battery cells and the like in the manufacture of which glass wool which consists of a yielding mass of very fine filaments, is employed for separating the plates. Said wool is extremely porous and is unaffected by the acids used.

In practice it is usually wrapped around the positive plate, but as now used it is practically impossible to ensure that a layer of uniform density obtain over the whole surface of the plate and it is not proof against short circuits owing to finely divided peroxide from the positive plate gradually filling the interstices of the glass wool until contact is made with the negative plate and a short circuit formed. The main objects of the present invention are to provide an improved combination of parts constituting a storage battery and to provide a new or improved material for separating the plates.

According to the invention the glass wool is formed into more or less flexible sheets of uniform thickness and density by superimposing several layers of filaments upon one another and connecting them together by a suitable kind of cement such as gelatine or sodium silicate. The resultant sheet of what may be described as glass wool felt is flexible and easily handled.

Figure 1:
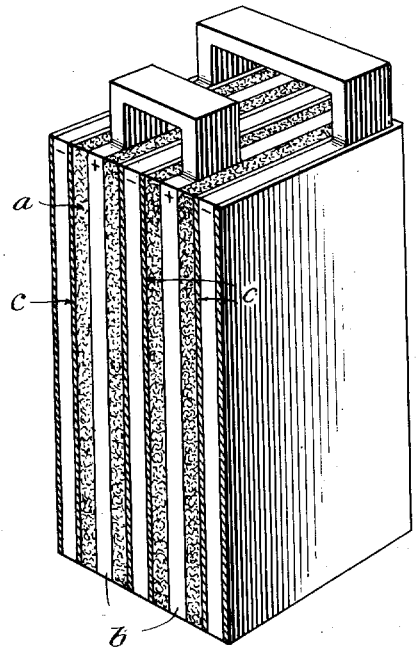
Fig. 1 is a perspective view of an assembled battery unit showing one use of my improved separator.
Figure 2:
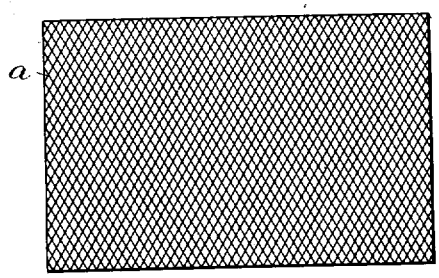
Fig. 2 is a diagrammatic view showing the manner of arranging the filaments of one layer of the separator at an angle to the adjacent layers.

As a separator between the plates in a storage battery it is used in the following manner, a sheet of glass wool felt *a* is placed against the surface of the positive plates *b* on each side, and a thin sheet of porous wood *c*, is placed against the negative plates so that the separation of the plates is effected by the combination of a sheet of glass wool felt, and some kind of porous diaphragm, such as wood, perforated ebonite, etc. The glass wool felt being held in close contact with both faces of the positive plate, prevents disintegration of the peroxide paste while any tendency for fine particles of peroxide to percolate through the wool so as to make contact with the negative plates, is prevented by the wood or other porous diaphragm. Thin sheets of chemically treated wood or cellulose are preferably used in combination with the glass wool felt.

Owing to the very efficient filter-like action of the glass wool felt, deposit is prevented in a very high degree and consequently the necessity for cleaning out the cells is to a great extent obviated.

What I claim is:—

1. A separator for electric accumulators comprising a plurality of flexible layers of glass wool, each of said layers having the filaments arranged in a definite order and the filaments of each layer being placed at an angle to the filaments of the adjacent layers.

2. A separator for electric accumulators comprising a plurality of layers of glass wool, each of said superimposed layers having the filaments arranged in a definite order.

3. A separator for electric accumulators comprising a plurality of layers of glass wool of uniform thickness and porosity, said layers being superimposed one upon another and adhesively secured together.

4. A separator for electric accumulators comprising a plurality of superimposed layers of glass wool adhesively secured together.

5. A separator for electric accumulators comprising a plurality of layers of glass wool of uniform thickness and porosity, said layers being superimposed one upon another and adhesively secured together by an adhesive material soluble in the electrolyte and free from material having deleterious effect on the battery plates.

6. A separator for storage batteries comprising a plurality of separate layers of vitreous fibres adhesively secured together to form a sheet of uniform thickness and porosity and possessed of mechanical strength.

7. A separator for storage batteries comprising a stratified sheet of glass wool of uniform thickness and porosity possessed of mechanical strength and a fibrous unitary diaphragm of uniform porosity.

8. A separator for storage batteries comprising a sheet formed of a plurality of superimposed layers of glass wool felt, said sheet being of uniform thickness and porosity, and a permeable diaphragm in contact with said sheet.

9. In combination, a positive plate, a negative plate, a separator for said plates comprising a separate layer of stratified glass wool of uniform thickness and porosity in contact with the positive plate and a fibrous diaphragm between the glass wool and the negative plate.

10. In combination, a positive plate, a negative plate, a stratified sheet of glass wool felt of uniform thickness and porosity in contact with the positive plate and a permeable spacing and supporting plate in contact with the negative plate, said supporting plate being formed of treated wood.

11. In combination, a positive plate, a negative plate, a sheet of glass wool felt of uniform thickness and porosity in contact with the positive plate and an imperforate sheet of wood in contact with the negative plate, said sheet comprising superimposed layers of filaments.

12. A separator including in combination a plurality of superposed layers of vitreous fiber and a permeable wood diaphragm adapted to contact with at least one of said layers

JOHN WADDELL.